(12) United States Patent
Ohara

(10) Patent No.: US 12,382,500 B2
(45) Date of Patent: Aug. 5, 2025

(54) USER EQUIPMENT AND CONTROL METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 596 days.

(21) Appl. No.: 17/429,209

(22) PCT Filed: Feb. 14, 2019

(86) PCT No.: PCT/JP2019/005453
§ 371 (c)(1),
(2) Date: Aug. 6, 2021

(87) PCT Pub. No.: WO2020/166046
PCT Pub. Date: Aug. 20, 2020

(65) Prior Publication Data
US 2022/0132580 A1    Apr. 28, 2022

(51) Int. Cl.
*H04W 74/08*    (2024.01)
*H04W 74/0833*    (2024.01)

(52) U.S. Cl.
CPC ................ *H04W 74/0833* (2013.01)

(58) Field of Classification Search
CPC ......... H04W 74/0833; H04W 72/1268; H04W 74/002
See application file for complete search history.

(56) References Cited

U.S. PATENT DOCUMENTS

| | | | |
|---|---|---|---|
| 11,844,138 B2* | 12/2023 | Babaei | H04W 76/28 |
| 2015/0208440 A1* | 7/2015 | Agiwal | H04W 74/085 |
| | | | 370/329 |
| 2017/0019930 A1* | 1/2017 | Lee | H04W 72/21 |
| 2018/0103465 A1* | 4/2018 | Agiwal | H04W 74/0833 |
| 2019/0029040 A1* | 1/2019 | Sun | H04W 72/0446 |
| 2020/0154383 A1* | 5/2020 | Sutton | H04W 74/0833 |
| 2020/0260498 A1* | 8/2020 | Xu | H04W 52/36 |
| 2020/0359426 A1* | 11/2020 | Pan | H04W 74/0808 |
| 2021/0136823 A1* | 5/2021 | Kim | H04W 52/50 |
| 2021/0212112 A1* | 7/2021 | Jia | H04W 56/001 |
| 2021/0282189 A1* | 9/2021 | Irukulapati | H04L 5/0053 |
| 2021/0392700 A1 | 12/2021 | Chen | |
| 2022/0070938 A1* | 3/2022 | Wu | H04L 5/0094 |

(Continued)

FOREIGN PATENT DOCUMENTS

| | | |
|---|---|---|
| WO | 2020/147577 A1 | 7/2020 |
| WO | 2020/166103 A1 | 8/2020 |

OTHER PUBLICATIONS

Office Action issued in counterpart Japanese Patent Application No. 2020-572027 mailed on Dec. 20, 2022 (5 pages).

(Continued)

*Primary Examiner* — John D Blanton
(74) *Attorney, Agent, or Firm* — Osha Bergman Watanabe & Burton LLP

(57) ABSTRACT

A user equipment includes a transmitting unit configured to transmit a message in a random access procedure by using a preamble resource and a PUSCH resource, and a control unit configured to start a time window for monitoring a random access response after a resource that is one of the preamble resource and the PUSCH resource whichever ends later in time domain.

6 Claims, 10 Drawing Sheets

(56) References Cited

U.S. PATENT DOCUMENTS

| | | | | |
|---|---|---|---|---|
| 2022/0104267 A1* | 3/2022 | Gao | .................. | H04W 72/1268 |
| 2022/0116999 A1* | 4/2022 | Xiong | ................. | H04W 74/006 |
| 2022/0132580 A1* | 4/2022 | Ohara | ............... | H04W 74/0833 |
| 2022/0132591 A1* | 4/2022 | Agiwal | ............. | H04W 74/0836 |
| 2022/0150973 A1* | 5/2022 | Lim | ...................... | H04W 72/23 |
| 2022/0190906 A1* | 6/2022 | Haghighat | ............ | H04W 24/08 |

OTHER PUBLICATIONS

Office Action issued in counterpart Indian Patent Application No. 202117037867 mailed on Jan. 24, 2023 (7 pages).
3GPP TSG RAN WG1 #90b R1-1718340 "Remaining details on RACH procedure" MediaTek Inc., Oct. 13, 2017 (10 pages).
3GPP TS 38.300 V15.4.0 "3rd Generation Partnership Project; Technical Specification Group Radio Access Network; NR; NR and NG-RAN Overall Description; Stage 2 (Release 15)" Dec. 2018 (97 pages).
3GPP TS 38.321 V15.4.0 "3rd Generation Partnership Project; Technical Specification Group Radio Access Network; NR; Medium Access Control (MAC) protocol specification(Release 15)", Dec. 2018 (77 pages).
International Search Report issued in International Application No. PCT/JP2019/005453, dated May 7, 2019 (5 pages).
Written Opinion issued in International Application No. PCT/JP2019/005453, dated May 7, 2019 (4 pages).
Notice of Reasons for Refusal issued in Japanese Application No. 2020-572027 mailed on Sep. 20, 2022 (6 pages).
Office Action issued in the counterpart Chinese Application No. 201980091345.3, mailed Oct. 11, 2023 (14 pages).
Office Action issued in counterpart Chinese Patent Application No. 201980091345.3 mailed on Mar. 30, 2024 (10 pages).

\* cited by examiner

USER EQUIPMENT AND CONTROL METHOD

TECHNICAL FIELD

The present invention relates to a user equipment in a wireless communication system.

BACKGROUND ART

In 3GPP (3rd Generation Partnership Project), a wireless communication systems referred to as NR (New Radio) or 5G have been studied to achieve higher capacity system, higher data transmission speed, lower delay in radio sections, and the like. In 5G, various wireless technologies and network architectures are being studied in order to satisfy the requirement that the delay of the radio section be 1 ms or less while achieving a throughput of 10 Gbps or more (for example, see Non-Patent Document 1).

PRIOR ART DOCUMENT

Non-Patent Document

Non-Patent Document 1: 3GPP TS 38.300 V15.4.0 (2018-12)
Non-Patent Document 1: 3GPP TS 38.321 V15.4.0 (2018-12)

SUMMARY OF THE INVENTION

Problem to be Solved by the Invention

In NR, a random access procedure similar to LTE is specified (Non-Patent Document 2). Further, in NR, in order to reduce latency and reduce power consumption, a random access procedure with a small number of steps (referred to as two-step RACH) has been started.

However, there is a problem in that the two-step RACH may not be executed appropriately for an operation using a RAR window which is a time window for monitoring a RAR (Random Access Response).

The present invention has been made in view of the above issues, and it is an object of the present invention to provide a technique for enabling appropriately executing an operation using a time window for monitoring a RAR in a random access procedure having a less number of steps.

Means for Solving Problem

According to the technique of the present disclosure, provided is a user equipment including a transmitting unit configured to transmit a message in a random access procedure by using a preamble resource and a PUSCH resource, and a control unit configured to start a time window for monitoring a random access response after a resource that is one of the preamble resource and the PUSCH resource whichever ends later in time domain.

Effect of the Invention

According to the technique of the present disclosure, a technique for enabling appropriately executing an operation using a time window for monitoring a RAR in a random access procedure having a less number of steps is provided.

MODE FOR CARRYING OUT THE INVENTION

An embodiment of the present invention will be hereinafter described with reference to drawings. The embodiment described below is an example, and the embodiment to which the present invention is applied is not limited to the following embodiment.

In operation of a wireless communication system according to the embodiment of the present invention, existing techniques are used as appropriate. An example of existing technique includes an existing NR or LTE, but the existing technique is not limited to the existing NR or LTE.

In this specification, terms used in the specifications of NR or LTE, such as PUSCH, PDCCH, RRC, and the like are used, but those expressed by channel names, protocol names, signal names, function names, and the like used in this specification may be referred to as other names.

(System Configuration)

Figure 1:
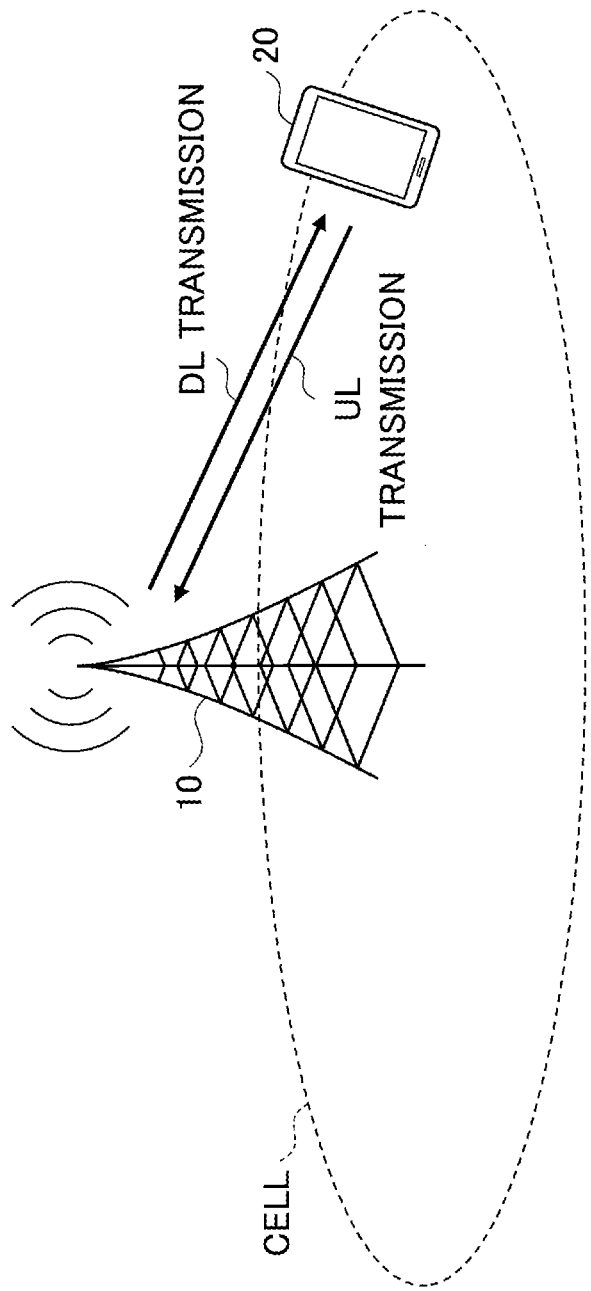
FIG. 1 is a drawing for explaining a wireless communication system according to an embodiment of the present invention.

FIG. 1 is a drawing for explaining a wireless communication system according to an embodiment of the present invention. As illustrated in FIG. 1, the wireless communication system according to the embodiment of the present invention includes a base station apparatus 10 and a user equipment 20. In FIG. 1, one base station apparatus 10 and one user equipment 20 are illustrated, but this is only an example. Alternatively, a plurality of base station apparatuses 10 and user equipments 20 may be provided.

The base station apparatus 10 provides one or more cells, and is a communication apparatus wirelessly communicating with the user equipment 20. The physical resource of a radio signal is defined by time domain and frequency domain. Time domain may be defined by OFDM symbol number. Frequency domain may be defined by the number of subcarriers or the number of resource blocks. It should be noted that a TTI (Transmission Time Interval) in the time domain may be a slot, or a TTI may be a subframe.

The base station apparatus 10 transmits a synchronization signal and system information to the user equipment 20. The synchronization signal is, for example, NR-PSS and NR-SSS. The system information is transmitted in, for example, NR-PBCH or PDSCH and is also referred to as broadcast information. As illustrated in FIG. 1, the base station apparatus 10 transmits a control signal or data to the user equipment 20 through DL (Downlink), and receives a control signal or data from the user equipment 20 through UL (Uplink). It should be noted that, here, those transmitted in control channels such as PUCCH, PDCCH, and the like are referred to as control signals, and those transmitted in shared channels such as PUSCH, PDSCH, and the like are referred to as data, but such a way in which the signals are referred to is only an example.

The user equipment 20 is a communication apparatus equipped with a wireless communication function such as a smartphone, a mobile phone, a tablet, a wearable terminal, and a communication module for M2M (Machine-to-Machine). As illustrated in FIG. 1, the user equipment 20 receives control signals or data from the base station apparatus 10 in DL, and transmits control signals or data to the base station apparatus 10 in UL, thereby using various communication services provided by the wireless communication system. It should be noted that the user equipment 20 may be referred to as a UE, and the base station apparatus 10 may be referred to as a gNB.

(Random Access Procedure)

Figure 2:
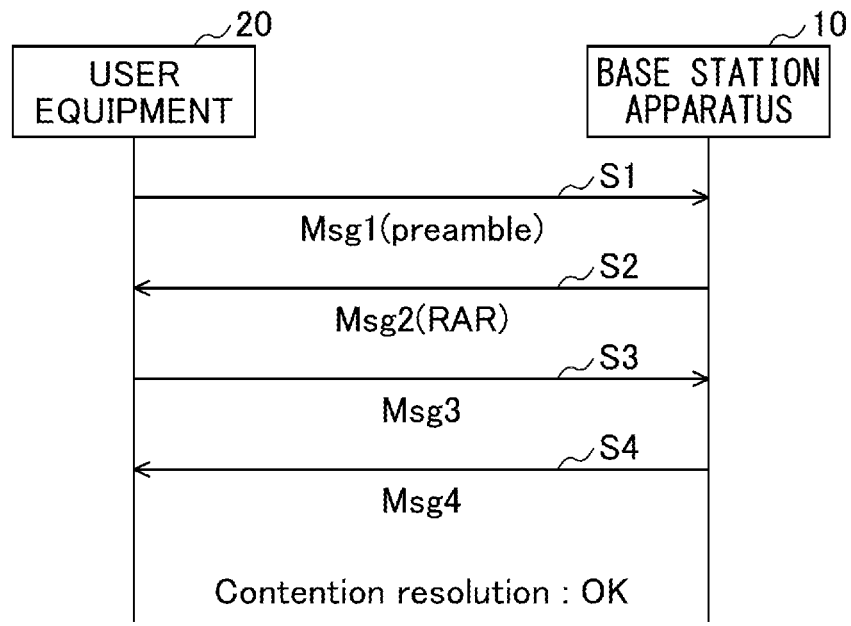
FIG. 2 is a drawing illustrating a four-step RACH.

First, an example of a four-step random access procedure executed by a wireless communication system according to the present embodiment will be explained with reference to FIG. 2. In the present embodiment, a CBRA (Contention based Random Access), in which the number of steps is to be reduced, will be explained. In CFRA (Contention Free Random Access), the random access procedure is basically completed when the UE receives Msg2, and therefore, CFRA already has a less number of steps. However, the present invention is not limited to CBRA, and the present invention may be applied to CFRA.

In NR, a random access procedure may be executed by selecting an SS/PBCH block (which may be referred to as an SSB, or may be referred to as a synchronization signal block or a synchronization signal), or a random access procedure may be executed by selecting a CSI-RS (Channel State Information-Reference Signal).

For example, the base station apparatus 10 transmits an SSB (or CSI-RS) for each beam, and the user equipment 20 monitors an SSB (or CSI-RS) of each beam. The user equipment 20 selects, from among a plurality of SSBs (or CSI-RSs), an SSB (or CSI-RS) which is received at a reception power higher than a predetermined threshold, and uses a PRACH resource (PRACH occasion) corresponding to the selected SSB (or CSI-RS) to transmit Message1 (Msg1 (=RA preamble)) (S1 of FIG. 2). Hereinafter, for the sake of convenience, an RA preamble will be referred to as a preamble.

When the base station apparatus 10 detects a preamble, the base station apparatus 10 transmits a Message2 (Msg2 (=RAR)), which is a response thereto, to the user equipment 20 (S2). The user equipment 20 having received Msg2 transmits a Message3 (Msg3) including predetermined information to the base station apparatus 10 (S3).

The base station apparatus 10 having received Msg3 transmits a Message4 (Msg4) to the user equipment 10 (S4).

When the user equipment 10 confirms that the predetermined information is included in the Msg4, the user equipment 10 recognizes that the Msg4 is a Msg4 addressed to the user equipment 20 corresponding to the Msg3 (Contention resolution: OK).

Since the above random access procedure includes four steps, the above random access procedure is referred to as a four-step RACH.

Subsequently, a random access procedure having a less number of steps for reducing delay and reducing power consumption will be described with reference to FIG. 3.

In S11, the user equipment 20 transmits MessageA (MsgA) including preamble and data to the base station apparatus 10. For example, in a manner similar to selection of a PRACH resource (PRACH occasion) in four-step RACH, the user equipment 20 selects a PRACH resource and transmits a preamble in the PRACH resource, and transmits data in a PUSCH resource associated with the PRACH resource. It should be noted that the preamble and the data herein correspond to, for example, Msg1 and Msg3 in the four-step RACH. In the two-step RACH, a resource for transmitting data is not limited to resource of PUSCH, and a resource of any channel for transmitting data (or control information) may be used.

In S12, the base station apparatus 10 transmits MessageB (MsgB) to the user equipment 20. The content of MsgB corresponds to, for example, Msg2 and Msg4 in the four-step RACH.

Since the above random access procedure includes two steps, the above random access procedure is referred to as a two-step RACH. The two-step RACH is an example of a random access procedure in which the number of steps is reduced.

(Operation Related to Problems)

In the four-step RACH of NR explained with reference to FIG. 2, a RAR window starts from the first symbol of the first CORESET (Control resource set) that is one or more symbols after the last symbol of the PRACH occasion in which the preamble (Msg1) is transmitted. The CORESET is a resource for receiving (monitoring) control information, and is configured by the base station apparatus 10 with an RRC message and the like for the user equipment 20.

For example, the time length of the RAR window is configured by the base station apparatus 10 for the user equipment 20. In the four-step RACH, from the start of the RAR window to reception of Msg2 addressed to the user equipment 20 (until the completion of the RAR window, if the user equipment 20 does not receive Msg2 addressed to the user equipment 20), the user equipment 20 monitors Msg2 addressed to the user equipment 20 in the resource for receiving the control information.

Also in the two-step RACH, from the start of the RAR window to reception of MsgB addressed to the user equipment 20 (until the completion of the RAR window, if the user equipment 20 does not receive MsgB addressed to the user equipment 20), the user equipment 20 monitors MsgB addressed to the user equipment 20. However, this operation in the two-step RACH is an example, and an operation other than the above operation may be executed as an operation related to the RAR window.

In the two-step RACH, information corresponding to Msg1 (preamble) and information corresponding to Msg3 (data in PUSCH) are transmitted as MsgA. It can be considered that the preamble and the data in PUSCH are transmitted in different time resources.

Here, in a case where data in PUSCH is transmitted in a time resource after a preamble, a case where a RAR window starts at a point in time after the preamble but before the start of PUSCH is assumed. In this case, since the RAR window starts even though the transmission of MsgA is not completed, it is considered that the user equipment 20 may start attempting to receiving Msg2 or MsgB. In this case, unless a countermeasure such as the second embodiment explained later is carried out, the user equipment 20 may deviate from the procedure of the two-step RACH, the random access procedure may not be appropriately carried out.

Hereinafter, as techniques according to the present embodiment for solving the above problems, the first embodiment, the second embodiment, and the third embodiment will be explained. Any of the first embodiment, the second embodiment, and the third embodiment is an operation example related to a RAR window in two-step RACH as illustrated in FIG. 3.

In the following explanation, the preamble resource may be referred to as a PRACH resource or a PRACH occasion. The "resource" herein is a time and frequency resource unless otherwise specified.

First Embodiment

<Case where PUSCH is after Preamble>

Figure 3:
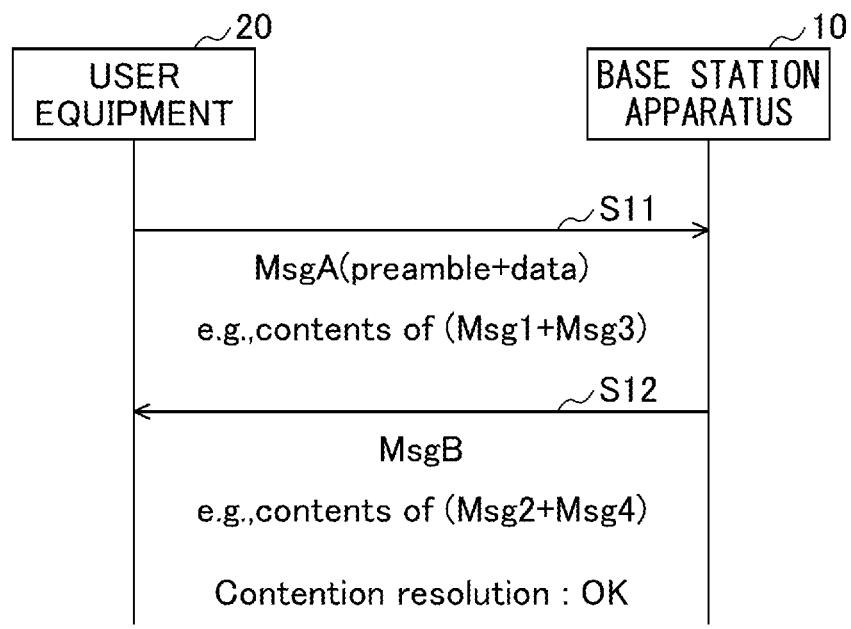
FIG. 3 is a drawing illustrating a two-step RACH.

In a case where there is a PUSCH resource after a time domain of a preamble resource in transmission of MsgA in step S11 of FIG. 3, the user equipment 20 starts the RAR window after the PUSCH resource.

More specifically, for example, after the user equipment 20 transmits MsgA in a preamble resource and a PUSCH resource, the user equipment 20 starts a RAR window from the first symbol of the first CORESET that is at least one symbol after the last symbol of the PUSCH resource.

The CORESET is a resource for receiving (monitoring) control information, and is configured by the base station apparatus 10 with an RRC message and the like for the user equipment 20. For example, the time length of the RAR window is configured by the base station apparatus 10 for the user equipment 20 with an RRC message and the like. For example, from the start of the RAR window to reception of MsgB addressed to the user equipment 20 (until the completion of the RAR window, if the user equipment 20 does not receive MsgB addressed to the user equipment 20), the user equipment 20 monitors MsgB addressed to the user equipment 20 in the CORESET.

Figure 4:
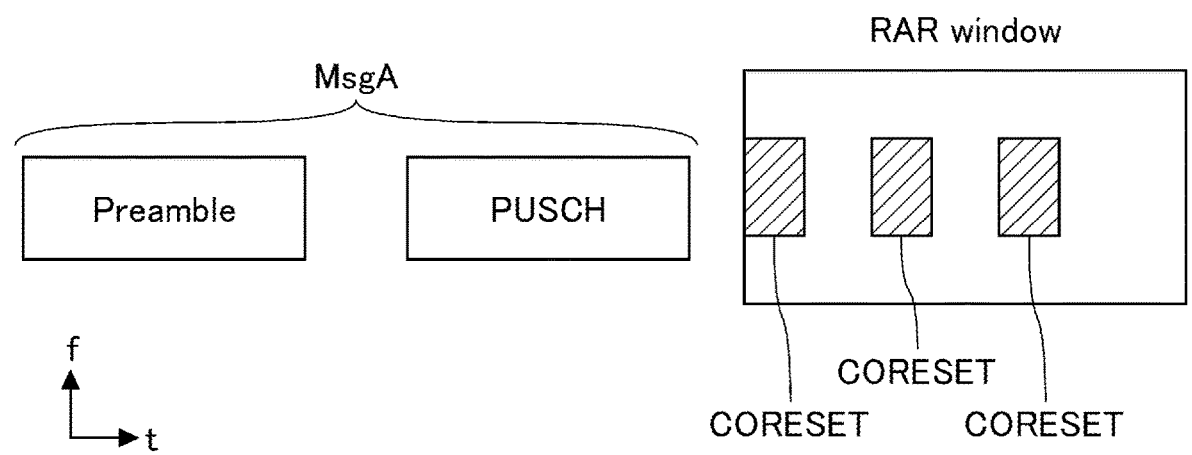
FIG. 4 is a drawing illustrating an example of a RAR window according to a first embodiment.

FIG. 4 illustrates an Example 1 in a case where there is a PUSCH resource after a preamble resource. FIG. 4 illustrates an image of CORESET in a RAR window. In Example 1 illustrated in FIG. 4, a PUSCH resource starts with a gap from the end of the preamble resource. As described above, a RAR window starts after the end of the PUSCH resource.

Figure 5:
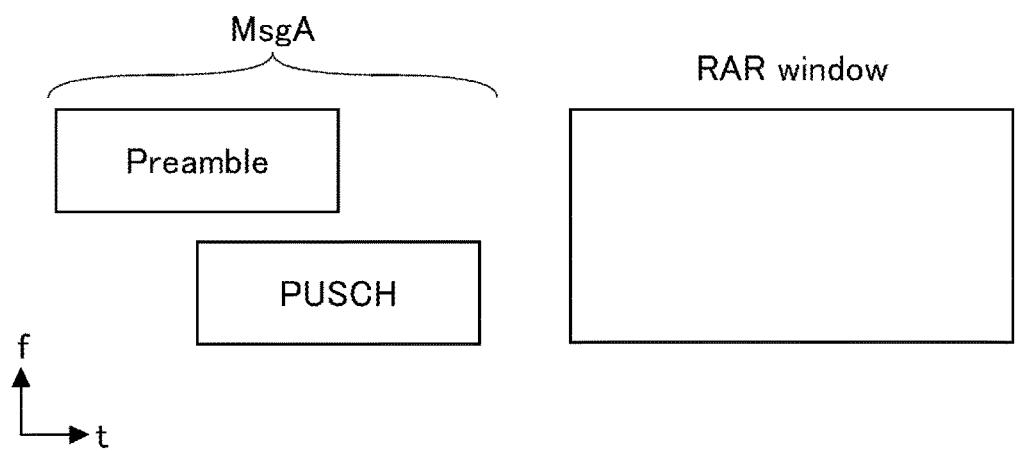
FIG. 5 is a drawing illustrating an example of a RAR window according to the first embodiment.

FIG. 5 illustrates Example 2 in a case where there is a PUSCH resource after a preamble resource. In Example 2 illustrated in FIG. 5, a PUSCH resource starts at a time position after a start of the preamble resource but before the end of the preamble resource, and the PUSCH resource ends after the end of the preamble resource. In this case, a RAR window also starts after the end of the PUSCH resource.

<Case where Preamble is after PUSCH>

In a transmission of MsgA in step S11 of FIG. 3, in a case where there is a preamble resource after a PUSCH resource, the user equipment 20 starts a RAR window after the preamble resource.

More specifically, for example, after the user equipment 20 transmits MsgA in the preamble resource and the PUSCH resource, the user equipment 20 starts a RAR window from the first symbol of the first CORESET at least one symbol after the last symbol of the preamble resource.

Figure 6:
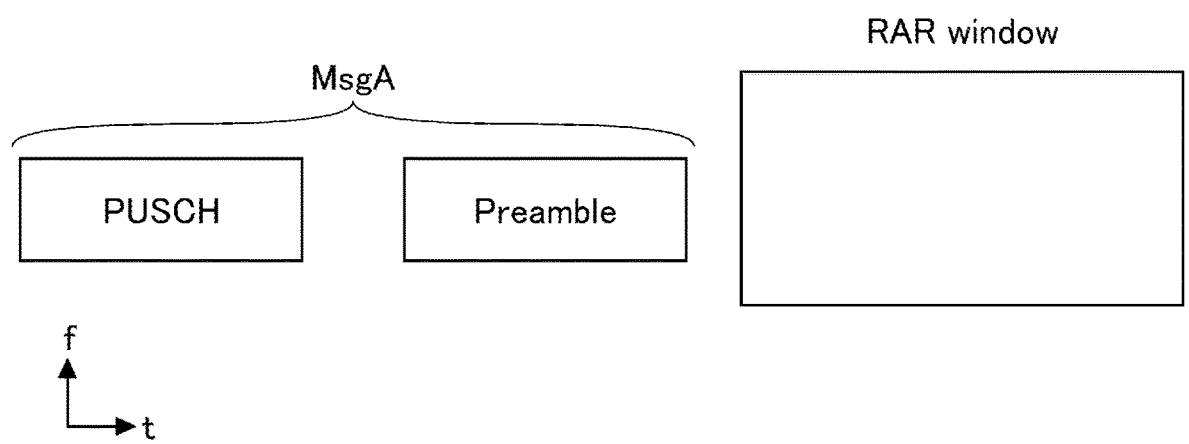
FIG. 6 is a drawing illustrating an example of a RAR window according to the first embodiment.

FIG. 6 illustrates an Example 1 in a case where there is a preamble resource after a PUSCH resource. In Example 1 illustrated in FIG. 6, a preamble resource starts with a gap from the end of the PUSCH resource. As described above, a RAR window starts after the end of the preamble resource.

Figure 7:
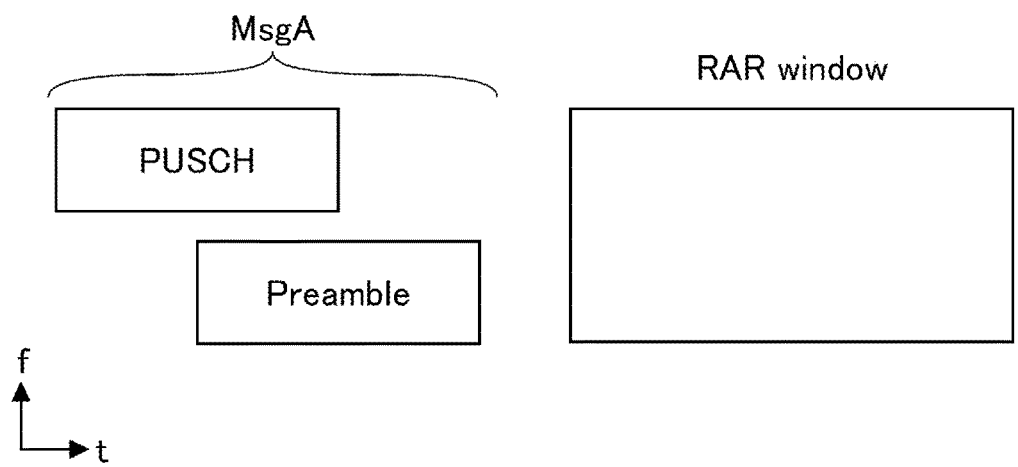
FIG. 7 is a drawing illustrating an example of a RAR window according to the first embodiment.

FIG. 7 illustrates an Example 2 in a case where there is a preamble resource after a PUSCH resource. In Example 2 illustrated in FIG. 7, a preamble resource starts at a time position after the start of the PUSCH resource but before the end of the PUSCH resource, and the preamble resource ends after the end of the PUSCH resource. In this case, a RAR window also starts after the end of the preamble resource.

<Case where the End of Preamble and the End of PUSCH are at the Same Time Position>

Figure 8:
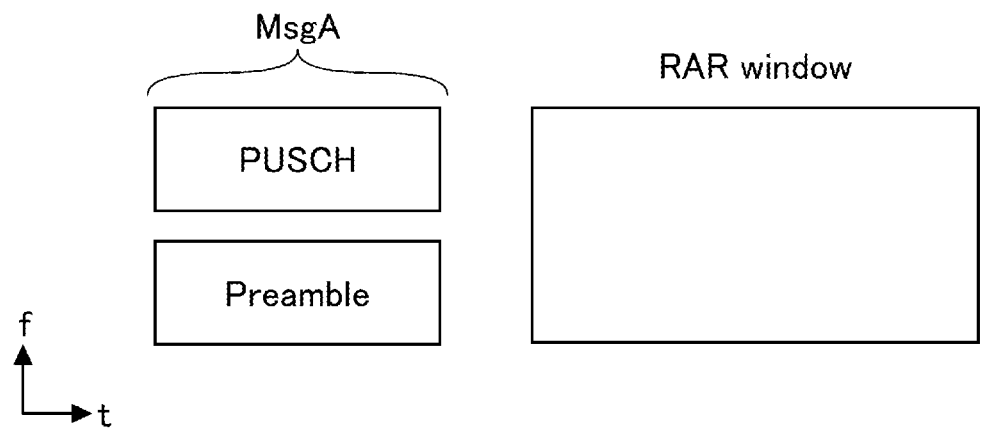
FIG. 8 is a drawing illustrating an example of a RAR window according to the first embodiment.

As illustrated in FIG. 8, in a case where the end of the PUSCH resource and the end of the preamble resource are at the same time position, the user equipment 20 may start a RAR window from the first symbol of the first CORESET at least one symbol after the last symbol of the preamble resource, or may start a RAR window from the first symbol of the first CORESET at least one symbol after the end of the PUSCH resource symbol.

<Case where Arrangement of Preamble and PUSCH May Change>

The user equipment 20 determines the preamble resource and the PUSCH resource used by the user equipment 20 on the basis of, for example, configuration information received from the base station apparatus 10. In this case, the arrangement of the preamble resource and the PUSCH resource may change due to configuration information and the like. In other words, according to the configuration, the arrangement of the preamble resource and the PUSCH resource may be any one of the arrangements illustrated in FIG. 4 to FIG. 8.

Accordingly, the user equipment 20 may start a RAR window after any one of the PUSCH resource and the preamble resource whichever ends later in time.

More specifically, for example, the user equipment 20 starts a RAR window from the first symbol of the first CORESET at least one symbol after the last symbol of any one of the PUSCH resource and the preamble resource whichever ends later in time domain.

A RAR window starts after the transmission of MsgA is completed according to the method explained in the first embodiment, and therefore, the random access procedure can be appropriately carried out without deviating from the procedure of the two-step RACH.

Second Embodiment

Figure 9:
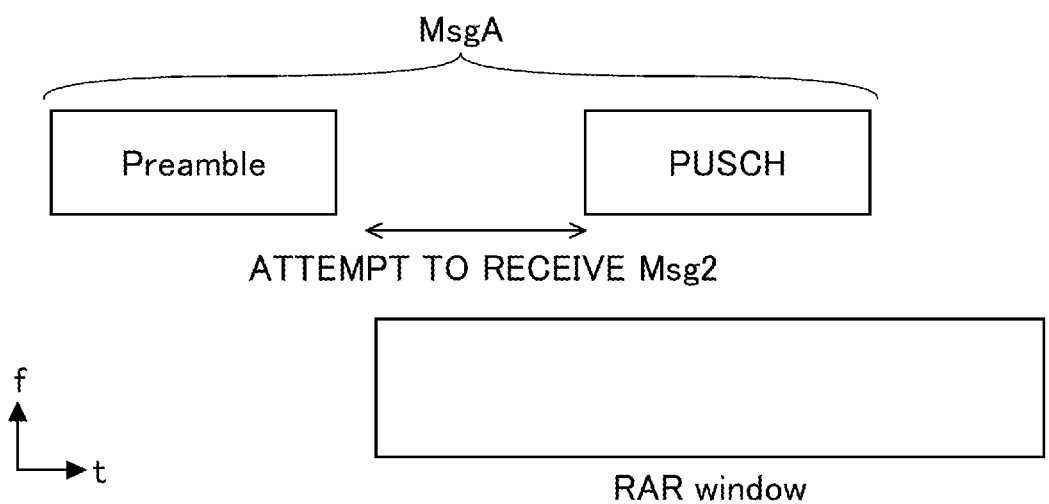
FIG. 9 is a drawing for explaining an operation of a user equipment according to a second embodiment.

The second embodiment is an example of operation in a case where there is a PUSCH resource after a preamble resource in transmission of MsgA in step S11 of FIG. 3. FIG. 9 illustrates an example. FIG. 9 is an example in which there is a gap in time between the end of the preamble resource and the start of the PUSCH resource.

As illustrated in FIG. 9, the user equipment 20 transmits a preamble in a preamble resource, starts a RAR window from the first symbol of the first CORESET at least one symbol after the last symbol of the preamble resource, monitors a PDCCH in the RAR window, and attempts to receive Msg2.

In the example as illustrated in FIG. 9, in a case where, from the start of the RAR window to the transmission timing of MsgA in PUSCH (the start of the time resource for PUSCH), the user equipment 20 receives a RAR (Msg2)

corresponding to the preamble transmitted by the user equipment 20, the user equipment 20 falls back to the four-step RACH, and thereafter, transmits data as Msg3 in the resource for PUSCH. Thereafter, the user equipment 20 receives Msg4 from the base station apparatus 10.

It should be noted that a RAR corresponding to a preamble transmitted by the user equipment 20 is, for example, a RAR including the index of the preamble transmitted by the user equipment 20. The RAR corresponding to the preamble transmitted by the user equipment 20 may be referred to as a "RAR addressed to the user equipment 20".

In the example illustrated in FIG. 9, in a case where, from the start of the RAR window to the transmission timing of MsgA in PUSCH (the start of the time resource for PUSCH), the user equipment 20 cannot receive the RAR (Msg2) corresponding to the preamble transmitted by the user equipment 20, the user equipment 20 continues a procedure of two-step RACH, and transmits Msg3 as (a part of) MsgA in PUSCH resource.

Examples of cases where the user equipment 20 cannot receive the RAR (Msg2) corresponding to the preamble transmitted by the user equipment 20 include a case where the user equipment 20 is not receiving any RAR at all and a case where the user equipment 20 receives an RAR that is not addressed to the user equipment 20.

Figure 10:
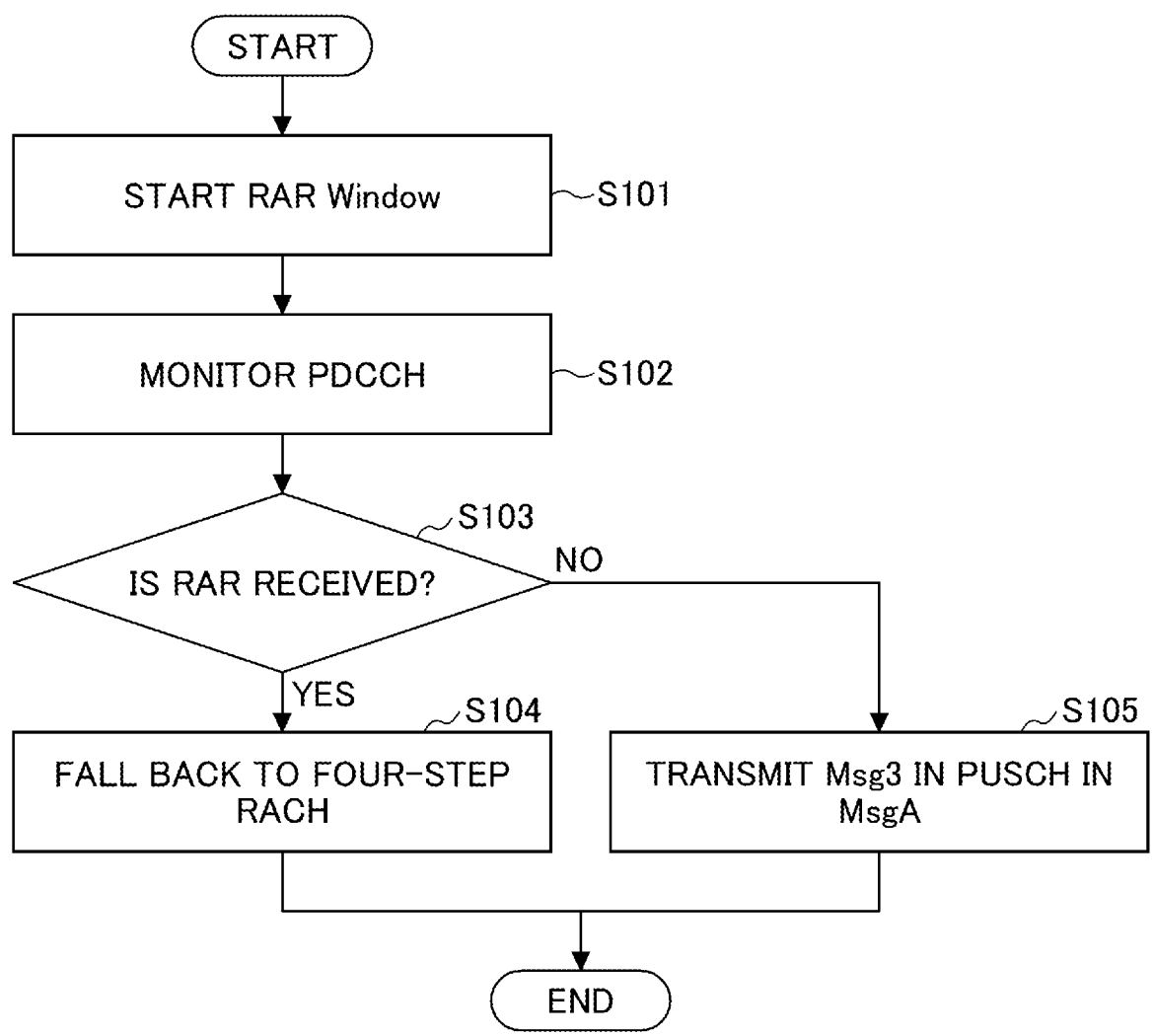
FIG. 10 is a flowchart for explaining an operation of the user equipment according to the second embodiment.

FIG. 10 is a flowchart corresponding to the above processing content. As illustrated in FIG. 10, the user equipment 20 starts a RAR window at the timing explained with reference to FIG. 9 (S101), and monitors PDCCH (S102). In S103, in a case where the user equipment 20 receives the RAR addressed to the user equipment 20, the user equipment 20 proceeds to step S104, and the user equipment 20 falls back to the four-step RACH.

In a case where, from the start of the RAR window to the transmission timing of MsgA in PUSCH (the start of the time resource for PUSCH), the user equipment 20 cannot receive the RAR addressed to the user equipment 20 in step S103, the user equipment 20 continues the procedure of two-step RACH, and transmits Msg3 as (a part of) MsgA in a PUSCH resource.

In step S104, i.e., in a case where the user equipment 20 falls back to four-step RACH and transmits Msg3, the following options 1 to 3 are available for a PUSCH resource with which the user equipment 20 uses to transmit Msg3.

<Option 1>

The user equipment 20 selects a PUSCH resource for Msg 3 on the basis of a UL grant included in a RAR (Msg2) (scheduling information about Msg3).

<Option 2>

The user equipment 20 transmits Msg3 by using a PUSCH resource for MsgA.

<Option 3>

The user equipment 20 executes Option 1 in a case where the received RAR includes a UL grant, and executes Option 2 in a case where the received RAR does not include a UL grant. Examples of cases where a RAR does not include a UL grant include a case where a UL grant is a certain designated bit string and a case where a predetermined bit in an RAR notifies that a UL grant is not to be used for Msg3.

A RAR window can start from an appropriate time position according to the method explained in the second embodiment. In addition, before the transmission of MsgA is completed, reception of Msg2 is attempted, and if Msg2 is successfully received, Msg3 is transmitted, and therefore, there is an effect of reducing delay.

Third Embodiment

Subsequently, the third embodiment will be explained. The third embodiment can be applied to either the first embodiment or the second embodiment. A RAR window explained in the third embodiment may be a RAR window started according to the method explained in the first embodiment, or a RAR window started according to the method explained in the second embodiment. The RAR window explained in the third embodiment may be a RAR window that is started according to a method different from any of the RAR window started according to the method explained in the first embodiment and the RAR window started according to the method explained in the second embodiment.

In the third embodiment, it is assumed that, after the user equipment 20 transmits MsgA, the user equipment 20 monitors Msg2 and MsgB at a same time, but RAR windows monitored by the user equipment 20 may be a RAR window common to both of Msg2 and MsgB, or may be respective RAR windows which are different for Msg2 and MsgB.

A case where, in two-step RACH explained in FIG. 3, the user equipment 20 transmits MsgA and the base station apparatus 10 successfully receives a preamble of MsgA but fails to receive data of MsgA in PUSCH will be considered. At this occasion, in a case where the base station apparatus 10 cannot distinguish whether a preamble transmitted from the user equipment 20 is of two-step RACH or of four-step RACH, the base station apparatus 10 transmits Msg2.

However, since the user equipment 20 has transmitted MsgA, the user equipment 20 is expecting MsgB, but the user equipment 20 receives Msg2 contrary to the expectation, and therefore, this is a deviation from the procedure of two-step RACH.

Even in a case where the base station apparatus 10 can distinguish whether the preamble transmitted from the user equipment 20 is of two-step RACH or of four-step RACH (for example, a resource is different), delay increases because it is necessary to retransmit MsgA if the procedure of two-step RACH is continued.

Therefore, in the third embodiment, in a case where the user equipment 20 receives, in the RAR window, a RAR (Msg2) corresponding to the preamble transmitted by the user equipment 20, the user equipment 20 falls back to four-step RACH to transmit data as Msg3 in PUSCH. Here, "receive RAR (Msg2)" means that the user equipment 20 does not receive MsgB (=Msg2+Msg4) but receives RAR (Msg2). In a case where the user equipment 20 receives MsgB addressed to the user equipment 20 in a RAR window, the user equipment 20 continues two-step RACH.

Figure 11:
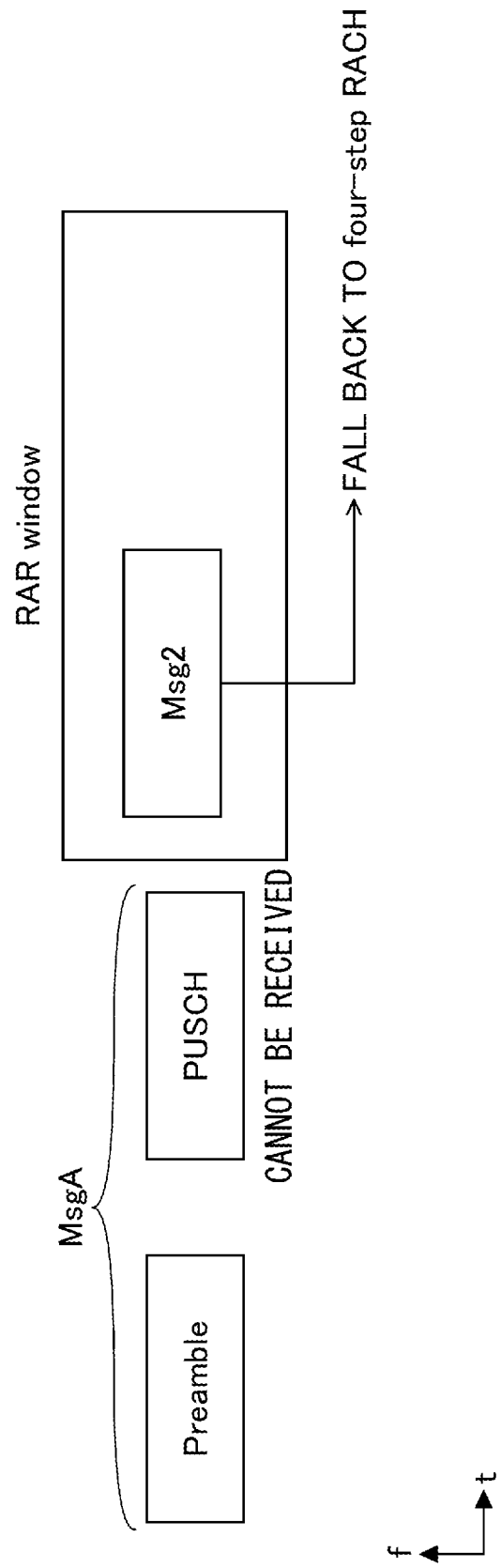
FIG. 11 is a drawing for explaining a third embodiment.

For a PUSCH resource for transmission of Msg3 after the fallback, the Options 1 to 3 explained in the second embodiment can be applied Example 1 is illustrated in FIG. 11. FIG. 11 illustrates an example in a case where a RAR window starts according to a method explained with reference to FIG. 4 of the first embodiment.

As illustrated in FIG. 11, the user equipment 20 transmits MsgA by a preamble resource and PUSCH resource. It is assumed that the base station apparatus 10 successfully receives a preamble of MsgA but fails to receive data in PUSCH.

The user equipment 20 starts a RAR window. The base station apparatus 10 transmits Msg2 instead of MsgB. Since the user equipment 20 receives the Msg2 within the RAR window, the user equipment 20 falls back to four-step RACH and transmits Msg3 in PUSCH.

Figure 12:
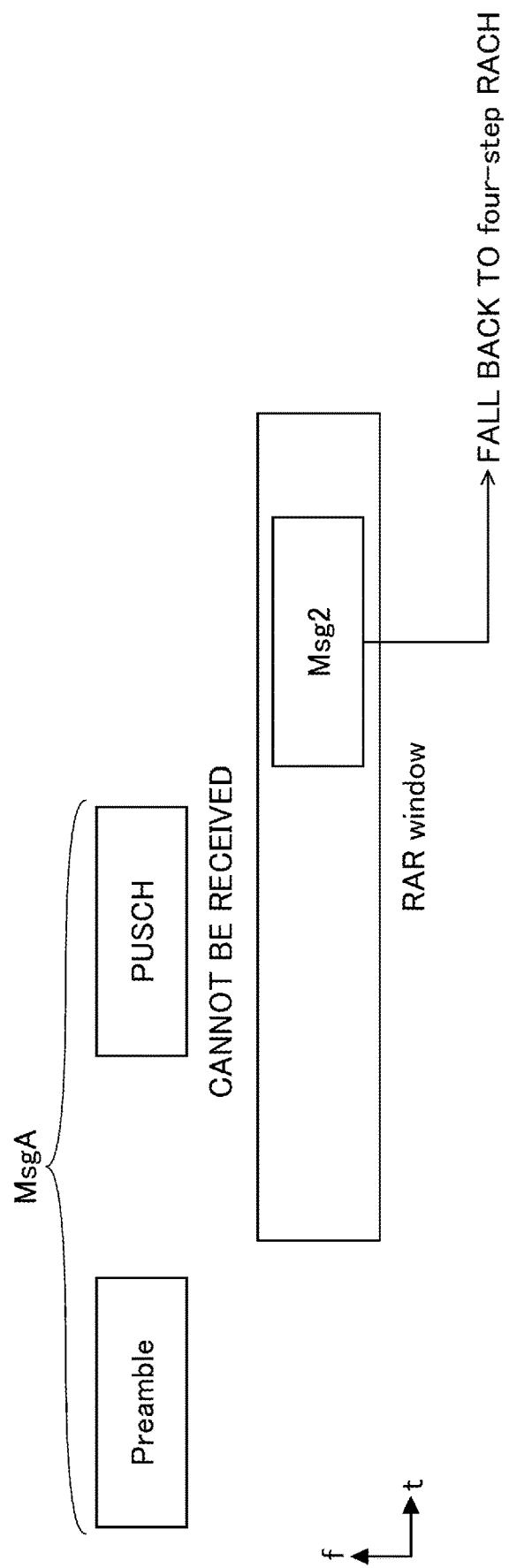
FIG. 12 is a drawing for explaining the third embodiment.

FIG. 12 illustrates an Example 2. FIG. 12 illustrates an example in a case where a RAR window starts according to a method explained with reference to FIG. 9 of the second embodiment. The operation of Example 2 is similar to that of Example 1. In the second embodiment, in a case where the user equipment 20 receives Msg2 before PUSCH of MsgA, the user equipment 20 falls back to four-step RACH, but in the third embodiment, the condition, "before PUSCH of MsgA", is not applied, and accordingly, the user equipment 20 performs fallback in a case where the user equipment 20 receives Msg2 within the RAR window.

In the third embodiment, the user equipment 20 transmits MsgA and thereafter monitors Msg2 and MsgB at a time. In monitoring, there are Options 1 to 3 as follows.

<Option 1>

The user equipment 20 distinguishes Msg2 and MsgB according to a different RNTI. For example, the user equipment 20 determines that data in PDSCH received based on a DCI detected by RNTI-A (control information transmitted in PDCCH) is Msg2, and determines that data in PDSCH received based on a DCI detected by RNTI-B is MsgB. For example, with a formula of RNTI, the user equipment 20 derives RNTI-A by calculating RNTI using a parameter designating Msg2, and derives RNTI-B by calculating RNTI using a parameter designating MsgB.

<Option 2>

A control signal (PDCCH) of Msg2 or MsgB may notify whether a message in question is Msg2 or MsgB. In other words, when the user equipment 20 receives a DCI in PDCCH, and detects, in the DCI, information indicating that Msg2 is transmitted, the user equipment 20 determines that the data received in PDSCH is Msg2. Conversely, when the user equipment 20 receives a DCI in PDCCH, and detects, in the DCI, information indicating that MsgB is transmitted, the user equipment 20 determines that the data received in PDSCH is MsgB.

<Option 3>

Whether a message in question is Msg2 or MsgB may be notified by a payload of Msg2 or MsgB. In this case, whether a message in question is Msg2 or MsgB may be notified explicitly by information in a payload. For example, when any given bit in a payload is 1 (or 0), this may indicate Msg2, and when any given bit in a payload is 0 (or 1), this may indicate MsgB. In this case, the user equipment 20 can determine whether the message in question is Msg2 or MsgB based on the bit.

The user equipment 20 may recognize whether a message in question is Msg2 or MsgB inexplicitly by what kind of information is included in a payload. For example, when the user equipment 20 finds that the message includes information that exists only in MsgB, the user equipment 20 determines that the message is MsgB.

In a case where an information string in the message is a specified information string, the user equipment 20 may determine that the message is Msg2 or MsgB.

According to the third embodiment, even in a case where the user equipment 20 having started two-step RACH receives Msg2 instead of MsgB, the user equipment 20 can appropriately continue random access procedure by falling back to four-step RACH.

<Apparatus Configuration>

Next, an example of functional configuration of the base station apparatus 10 and the user equipment 20 that execute the processing and operations described so far will be described. The base station apparatus 10 and the user equipment 20 include a function for implementing the first to third embodiments explained above. However, each of the base station apparatus 10 and the user equipment 20 may have only the functions of any one of the first to third embodiments.

<Base Station Apparatus 10>

Figure 13:
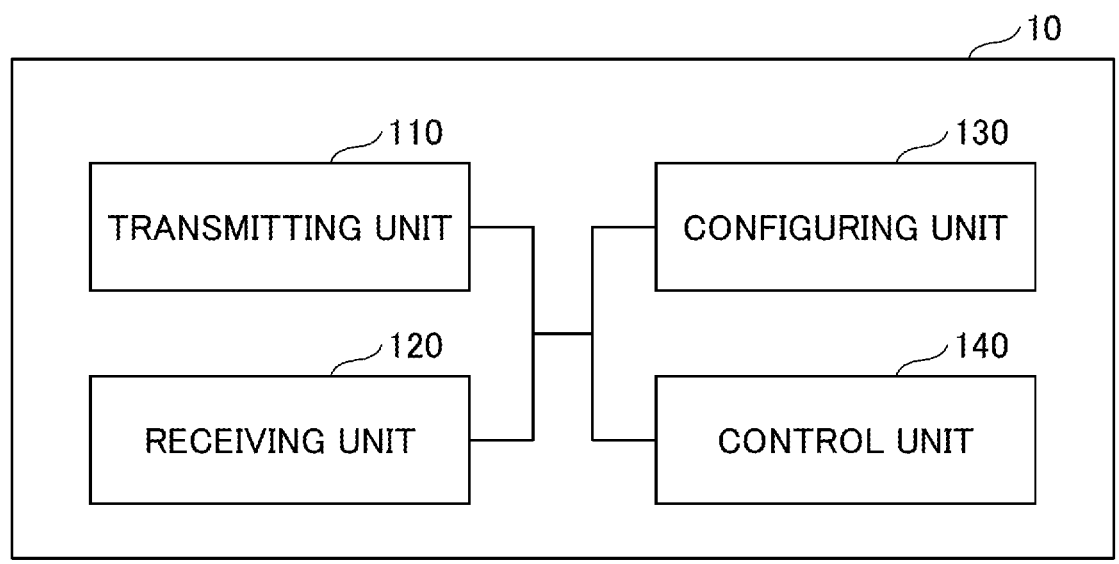
FIG. 13 is a drawing illustrating an example of a functional configuration of a base station apparatus 10 according to an embodiment of the present invention.

FIG. 13 is a drawing illustrating an example of a functional configuration of the base station apparatus 10. As illustrated in FIG. 13, the base station apparatus 10 includes a transmitting unit 110, a receiving unit 120, a configuring unit 130, and a control unit 140. The functional configuration illustrated in FIG. 13 is only an example. As long as the operation according to the embodiment of the present invention can be executed, the functions may be divided in any way, and the functional units may be given any names.

The transmitting unit 110 includes a function of generating signals to be transmitted to the user equipment 20 and wirelessly transmitting the signals. The receiving unit 120 includes a function of receiving various types of signals transmitted from the user equipment 20 and acquiring, for example, information on a higher layer from the received signals. Further, the transmitting unit 110 has a function of transmitting NR-PSS, NR-SSS, NR-PBCH, a DL/UL control signal, a DL data or the like to the user equipment 20.

The configuring unit 130 stores configuration information configured in advance and various configuration information to be transmitted to the user equipment 20 in a storage device and reads out the configuration information from the storage device as needed. The contents of the configuration information are, for example, preamble resource, PUSCH resource, RAR window length, and the like used for random access procedure.

For example, the control unit 140 determines a start of a RAR window used for the user equipment 20 on the basis of a resource and the like of the preamble received from the user equipment 20, and instructs the transmitting unit 110 to transmit control information in a control resource in a period of the RAR window. A functional unit configured to transmit signals in the control unit 140 may be included in the transmitting unit 110, and a functional unit configured to receive signals in the control unit 140 may be included in the receiving unit 120.

<User Equipment 20>

Figure 14:
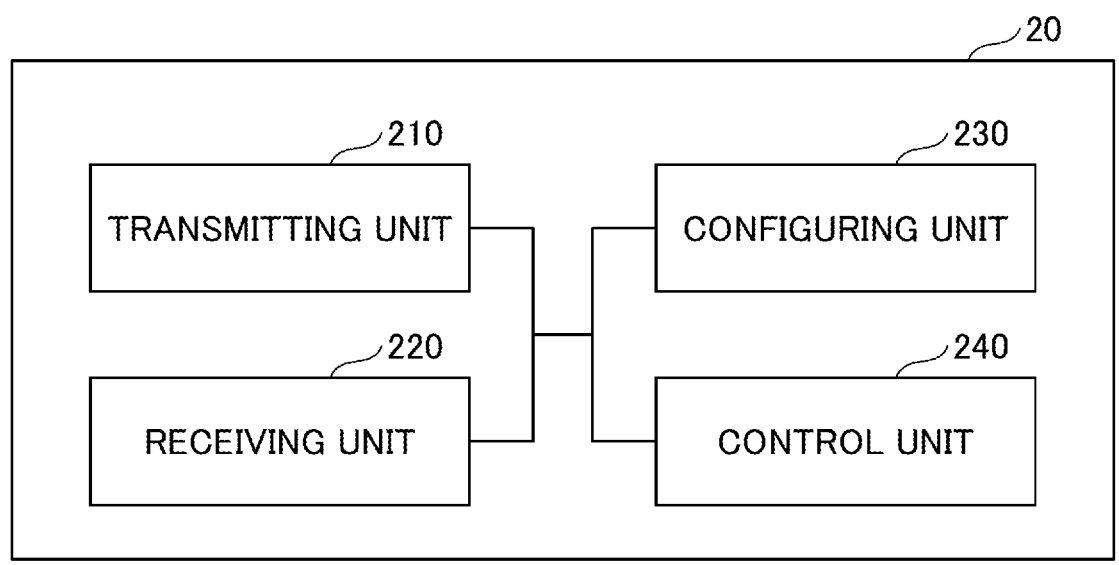
FIG. 14 is a drawing illustrating an example of a functional configuration of a user equipment 20 according to an embodiment of the present invention.

FIG. 14 is a drawing illustrating an example of a functional configuration of the user equipment 20. As illustrated in FIG. 14, the user equipment 20 includes a transmitting unit 210, a receiving unit 220, a configuring unit 230, and a control unit 240. The functional configuration illustrated in FIG. 14 is merely an example. As long as the operation according to the embodiment of the present invention can be executed, the functions may be divided in any way, and the functional units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer.

The configuring unit 230 stores in a storage device various types of configuration information received from the base station apparatus 10 by the receiving unit 220 and reads out the configuration information from the storage device as needed. The configuring unit 230 also stores configuration information configured in advance. The contents of the configuration information are, for example, preamble resource, PUSCH resource, RAR window length, and the like used for random access procedure.

The control unit 240 executes control so as to start a RAR window as explained in the first and second embodiments. Also, the control unit 240 executes control of fallback as explained in the second and third embodiments. More specifically, in a case where operation of the first embodiment is performed, the control unit 240 starts a RAR window after any one of the preamble resource and the PUSCH resource whichever ends later in time. In a case where operation of the second embodiment is performed, the control unit 240 starts a RAR window after the end of the preamble resource but before the start of the PUSCH resource. In a case where operation of the third embodiment is performed, the control unit 240 determines whether a message received in a RAR window is a RAR (Msg2) corresponding to the preamble transmitted in the preamble resource, and in a case where the message is a RAR (Msg2), the control unit 240 instructs the transmitting unit 210 to transmit data (Msg3) by using the PUSCH resource. A functional unit configured to transmit signals in the control unit 240 may be included in the transmitting unit 210, and a functional unit configured to receive signals in the control unit 240 may be included in the receiving unit 220.

<Hardware Configuration>

The block diagrams (FIGS. 13 and 14) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 15:
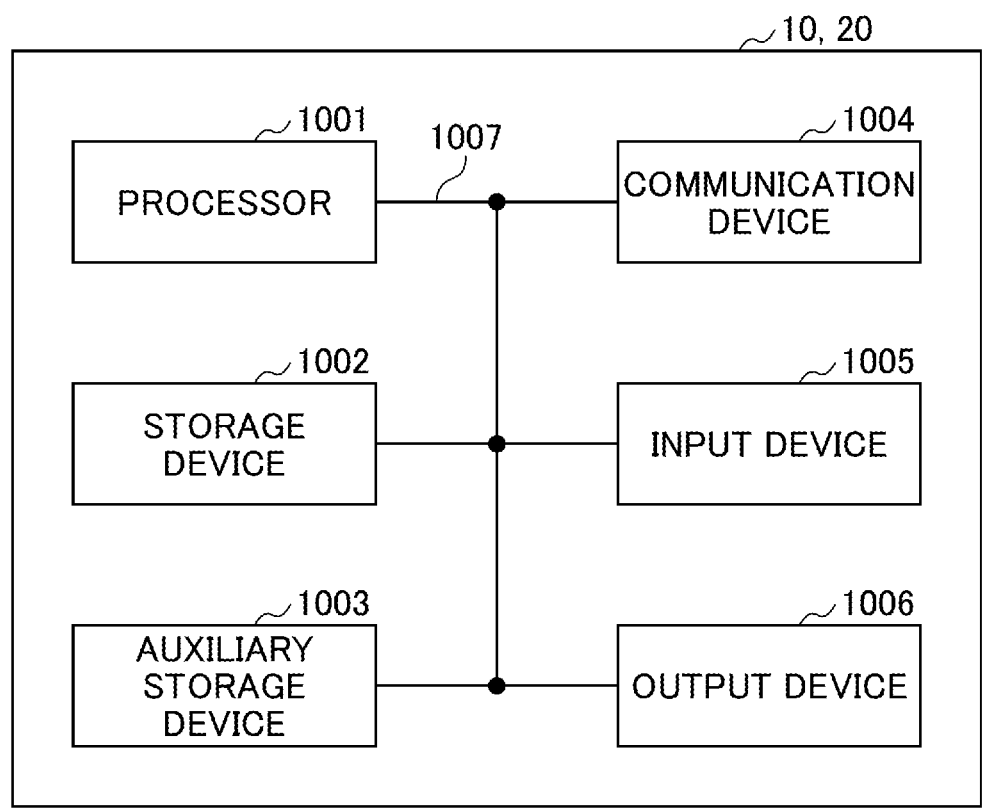
FIG. 15 is a drawing illustrating an example of a hardware configuration of the base station apparatus 10 or the user equipment 20 according to the embodiment of the present invention.

For example, the base station apparatus 10, the user equipment 20, and the like according to one embodiment of the present disclosure may function as a computer that performs processing of a wireless communication according to the present disclosure. FIG. 15 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 13, may be implemented by a control program that is stored in the storage device 1002 and that is executed by the processor 1001. Also, for example, the control unit 240 of the user equipment 20, as illustrated in FIG. 15, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD).

For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

<Summary of Embodiment>

As explained hereinabove, this specification discloses a user equipment and a control method described at least in each of the following items.

(First Item)

A user equipment including:
  a transmitting unit configured to transmit a message in a random access procedure by using a preamble resource and a PUSCH resource; and
  a control unit configured to start a time window for monitoring a random access response after a resource that is one of the preamble resource and the PUSCH resource whichever ends later in time domain.

(Second Item)

The user equipment according to the first item, wherein the control unit starts the time window from a first control resource set at least one symbol after a last symbol of the resource.

(Third Item)

A user equipment including
  a transmitting unit configured to transmit a preamble using a preamble resource which is among the preamble resource and a PUSCH resource for transmitting a message in a random access procedure; and
  a control unit configured to start a time window for monitoring a random access response after an end of the preamble resource but before a start of the PUSCH resource.

(Fourth Item)

The user equipment according to claim 3, wherein in a case where the user equipment receives a random access response addressed to the user equipment in the time window, the transmitting unit transmits data by using the PUSCH resource, or transmits the data by using a PUSCH resource selected on the basis of a UL grant included in the random access response.

(Fifth Item)

A user equipment including:
  a transmitting unit configured to transmit a message in a random access procedure by using a preamble resource and a PUSCH resource; and
  a transmitting unit configured to transmit data by using the PUSCH resource in a case where a message received in a time window for monitoring a random access response is a random access response corresponding to a preamble transmitted in the preamble resource.

(Sixth Item)

A control method executed by a user equipment, including:
  transmitting a message in a random access procedure by using a preamble resource and a PUSCH resource; and
  starting a time window for monitoring a random access response after a resource that is one of the preamble resource and the PUSCH resource whichever ends later in time domain.

(Seventh Item)

A control method executed by a user equipment, including:
  transmitting a preamble using a preamble resource which is among the preamble resource and a PUSCH resource for transmitting a message in a random access procedure; and
  starting a time window for monitoring a random access response after an end of the preamble resource but before a start of the PUSCH resource.

According to the technique of any one of the first, third, fifth to seventh items, an operation using a time window for monitoring a random access response can be appropriately executed in a random access procedure in which the number of steps is reduced. According to the technique of the second item, the start position of the start of the time window can be accurately determined. According to the technique of the fifth item, in a case where a random access response addressed to a user equipment is received, a PUSCH resource used for data transmission can be appropriately determined.

<Supplements to Embodiment>

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LIE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user equipment. For example, each aspect or embodiment of the present disclosure may be applied to a configuration in which communication between a base station apparatus and a user equipment is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user equipment according to the present disclosure may be replaced with a base station apparatus. In this case, a base station apparatus may have above-described functions of the user equipment.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, SS block or CSI-RS is an example of a synchronization signal or a reference signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

REFERENCE SIGNS LIST 10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a transmission unit configured to transmit a preamble and a PUSCH as a message in a 2 step random access procedure;
a control unit configured to start a time window for detecting a response message for the message, from a first symbol of a first control resource set after a last symbol of a resource of the preamble or the PUSCH; and
a reception unit configured to receive the response message during the time window,
wherein the control unit is configured to calculate a first value of an identifier in the response message of the 4 step random access procedure, and configured to calculate a second value of an identifier in the response message of the 2 step random access procedure, the first value being different from the second value.

2. The terminal as claimed in claim 1, wherein, when receiving a random access response for the preamble, the control unit falls back to a 4 step random access procedure from the 2 step random access procedure, and the transmission unit transmits a third message in the 4 step random access procedure based on an UL grant included in the received random access response.

3. The terminal as claimed in claim 2, wherein the control unit calculates a first value of an identifier in the response message of the 4 step random access procedure, or a second value of an identifier in the response message of the 4 step random access procedure, the first value being different from the second value.

4. A base station comprising:
a reception unit configured to receive a preamble and a PUSCH as a message in a 2 step random access procedure;
a control unit configured to start a time window for transmitting a response message for the message, from a first symbol of a first control resource set after a last symbol of a resource of the preamble or the PUSCH; and
a transmission unit configured to transmit the response message during the time window,
wherein the control unit is configured to calculate a first value of an identifier in the response message of the 4 step random access procedure, and configured to calculate a second value of an identifier in the response message of the 2 step random access procedure, the first value being different from the second value.

5. A communication system comprising:
a terminal comprising:
a transmission unit configured to transmit a preamble and a PUSCH as a message in a 2 step random access procedure;
a control unit configured to start a time window for detecting a response message for the message, from a first symbol of a first control resource set after a last symbol of a resource of the preamble or the PUSCH; and
a reception unit configured to receive the response message from a base station during the time window,
wherein the control unit is configured to calculate a first value of an identifier in the response message of the 4 step random access procedure, and configured to calculate a second value of an identifier in the response message of the 2 step random access procedure, the first value being different from the second value, and
the base station comprising:
a reception unit configured to receive a preamble and a PUSCH as a message in the 2 step random access procedure from the terminal;
a control unit configured to start a time window for transmitting a response message for the message, from a first symbol of a first control resource set after a last symbol of a resource of the preamble or the PUSCH; and
a transmission unit configured to transmit the response message to the terminal during the time window.

6. A communication method of a terminal, comprising:
transmitting a preamble and a PUSCH as a message in a 2 step random access procedure;
starting a time window for detecting a response message for the message, from a first symbol of a first control resource set after a last symbol of a resource of the preamble or the PUSCH; and
receiving the response message during the time window,
wherein the terminal is further configured to calculate a first value of an identifier in the response message of the 4 step random access procedure, and configured to calculate a second value of an identifier in the response message of the 2 step random access procedure, the first value being different from the second value.

* * * * *